United States Patent
Carroll

(10) Patent No.: US 6,615,165 B2
(45) Date of Patent: Sep. 2, 2003

(54) CABLE CONNECTIONS BETWEEN AN UNMANNED AIRCRAFT AND A DETACHABLE DATA HANDLING MODULE

(76) Inventor: Ernest A. Carroll, 12913 Alton Sq., No. 114, Herndon, VA (US) 20170

( * ) Notice: Subject to any disclaimer, the term of this patent is extended or adjusted under 35 U.S.C. 154(b) by 0 days.

(21) Appl. No.: 10/255,187

(22) Filed: Sep. 26, 2002

(65) Prior Publication Data

US 2003/0060944 A1 Mar. 27, 2003

Related U.S. Application Data

(60) Provisional application No. 60/324,931, filed on Sep. 27, 2001.

(51) Int. Cl.[7] .......................... B64C 1/00; B64C 11/00; B64C 13/00; G06F 1/00; G06F 17/00
(52) U.S. Cl. .................. 703/3; 244/4 R; 244/53 R; 244/190; 244/69; 244/71; 244/119
(58) Field of Search ............... 701/3, 35, 213; 244/4 R, 190, 69, 175, 71, 119, 53 R; 342/357.13, 357.06; 307/149

(56) References Cited

U.S. PATENT DOCUMENTS

| | | | | |
|---|---|---|---|---|
| 5,297,759 A | * | 3/1994 | Tilbor et al. ............... | 244/17.11 |
| 5,334,070 A | * | 8/1994 | Yu et al. ..................... | 446/31 |
| 5,503,350 A | * | 4/1996 | Foote ......................... | 244/1 R |
| 5,537,909 A | | 7/1996 | Schneider et al. | |
| 5,575,438 A | * | 11/1996 | McGonigle et al. .......... | 244/13 |
| RE35,590 E | * | 8/1997 | Bezos et al. ................. | 455/456 |
| 5,694,335 A | * | 12/1997 | Hollenberg .................. | 713/201 |
| 5,810,284 A | * | 9/1998 | Hibbs et al. .................. | 244/13 |
| 6,062,176 A | | 5/2000 | Berger | |
| 6,281,970 B1 | * | 8/2001 | Williams et al. .......... | 356/141.4 |
| 6,459,175 B1 | * | 10/2002 | Potega ........................ | 307/149 |
| 6,532,434 B1 | * | 3/2003 | West ........................... | 702/187 |
| 2002/0070312 A1 | * | 6/2002 | MacCready et al. ........... | 244/5 |

* cited by examiner

Primary Examiner—Thomas G. Black
Assistant Examiner—Ronnie Mancho
(74) Attorney, Agent, or Firm—David L. Banner

(57) ABSTRACT

A power and communications connection arrangement for a miniature, unmanned aircraft having data handling capability. The aircraft has a microprocessor for managing flight control, a GPS receiver, a communications radio frequency transceiver, and data handling apparatus. The latter may be any of a sensor for gathering environmental data, sensing aircraft altitude or attitude, a data relay station, or any combination of these. The data handling apparatus is part of a removable module mounted to and detachable from the aircraft. The connection arrangement includes stationary power and communications terminals fixed to the module, and corresponding free power and data cables completing respective power circuits and communications links within the aircraft. In the preferred embodiment, the microprocessor, at least one sensor, and a battery pack are located in the module, and a radio transceiver, a GPS receiver, controls such as rudder and elevator, and other sensors are located in the airframe.

5 Claims, 4 Drawing Sheets

CABLE CONNECTIONS BETWEEN AN UNMANNED AIRCRAFT AND A DETACHABLE DATA HANDLING MODULE

REFERENCE TO RELATED APPLICATION

This application is related to copending applications respectively entitled UNMANNED AIRCRAFT WITH AUTOMATIC FUEL-TO-AIR MIXTURE ADJUSTMENT, Ser. No. 10/255,184; MINIATURE, UNMANNED AIRCRAFT WITH ONBOARD STABILIZATION AND AUTOMATED GROUND CONTROL OP FLIGHT PATH, Ser. No. 10/255,183; MINIATURE, UNMANNED AIRCRAFT WITH AUTOMATICALLY DEPLOYED PARACHUTE, Ser. No. 10/255,185; MANUALLY DISASSEMBLED AND READILY SHIPPABLE MINIATURE, UNMANNED AIRCRAFT WITH DATA HANDLING CAPABILITY, Ser. No. 10/255,182; ENGINE DRIVEN SUPERCHARGER FOR AIRCRAFT, Ser. No. 10/255,189; ELECTRICAL POWER SUPPLY SYSTEM FOR UNMANNED AIRCRAFT, Ser. No. 10/255,188; and MINIATURE, UNMANNED AIRCRAFT WITH INTERCHANGEABLE DATA MODULE, Ser. No. 10/255,186, all filed of even date herewith and which are incorporated herein by reference, and to copending Ser. No. 60/324,931, filed Sep. 27, 2001.

BACKGROUND OF THE INVENTION

1. Field of the Invention

The present invention relates to remotely controlled miniature, unmanned aircraft suitable for use in aerial data collection and transmission, and more particularly to such aircraft having removable and replaceable data handling modules. The data handling modules have, for example, data sensors for acquiring imagery. The present invention is directed to electrical connections between the host airframe and an attached module.

2. Description of the Prior Art

Aircraft can play a role in collection and transmission of data. In transmission of data, an aircraft can serve as a relaying station for remotely originating transmissions. In collection of data, aircraft can be used to carry sensors for reconnaissance and other purposes. Uses of aerial reconnaissance for collecting data, such as multispectral imagery for example, are increasing as industries and businesses come to utilize the same to enhance productivity of their operations. An exemplary use of aerial imagery is that of precision farming, although many other uses exist. As aerial imagery and other data collection technology develops, it becomes desirable to decrease cost and increase practicality of airborne platforms used to acquire aerial imagery and other data.

Aerial imagery has traditionally been acquired through manned conventional aircraft and by satellite. Although both types of platforms are effective, both are quite expensive and limited in their abilities. Miniature, unmanned aircraft would be vastly more practical and lower in cost for most civilian applications.

Model aircraft remotely controlled by radio frequency signals have long been utilized by hobbyists among others. This has led to remotely controlled model aircraft being suggested for use in aerial data collection. U.S. Pat. No. 6,062,176, issued to Lee Berger on May 16, 2000, and U.S. Pat. No. 5,537,909, issued to Arthur J. Schneider et al., both describe use of model or miniaturized aircraft in data imagery acquisition. Berger's invention is an engine suitable for small aircraft which could be utilized for photoreconnaissance. No significant specific details for configuring a miniature aircraft to achieve data acquisition and transfer are proposed by Berger.

Schneider et al. utilize a miniature reconnaissance aircraft which is carried to the subject area of interest on another aircraft. However, there is no teaching of interchangeable modules containing data handling apparatus. There exists a need for miniature, unmanned aircraft suitable for use in collection of aerial data and transfer of data in commercial and other civil applications, which aircraft have readily removed and installed data collecting and transferring capabilities and convenient electrical power and communications connection schemes.

None of the above inventions and patents, taken either singly or in combination, is seen to describe the instant invention as claimed.

SUMMARY OF THE INVENTION

The present invention improves upon small scale, unmanned aircraft used in reconnaissance and especially in image acquisition, and in data transfer. Particularly addressing civilian uses in the United States, it is highly desirable to have an unmanned aircraft which is light enough to avoid the fifty-five pound limit which is a threshold above which severe restrictions on use of an aircraft are imposed, and to make such aircraft versatile in their missions by providing mission critical equipment in removable, modular form. This addresses the needs of rapidly deployed, universally applicable data collection in different applications.

A significant economic benefit is realized when one airframe can be fitted with different sensors and data handling apparatus in modular form. Provision of modules enables the aircraft to be readily prepared for different data acquisition or transfer missions, and also enables ready repair should data handling equipment become defective.

To this end, it is desirable to provide convenient, uncomplicated electrical connections between a host airframe and a replaceable module. Electrical connections encompass both power and communications, since a vast array of sensors, flight controls, radio frequency receivers, a microprocessor for managing flight, generator, battery packs, and still other electrically operated devices may be located in either the host airframe or the module, and must be interconnected for power supply and for control by electrical signals The present invention sets forth a connection scheme which satisfies the various electrical needs while standardizing on configuration of connectors, so that the process of connecting a newly installed module to a host airframe is greatly facilitated.

Accordingly, it is one object of the invention to provide an aircraft for use in data acquisition and handling which is readily reconfigured for different missions and offers ready replacement of data handling apparatus.

Another object of the invention is to utilize one airframe for different missions, thereby economizing on the number of airframes which must be manufactured and maintained when conducting aerial data acquisition and transfer operations.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION OF THE PREFERRED EMBODIMENTS

1. General Characteristics of the Aircraft

Figure 1:
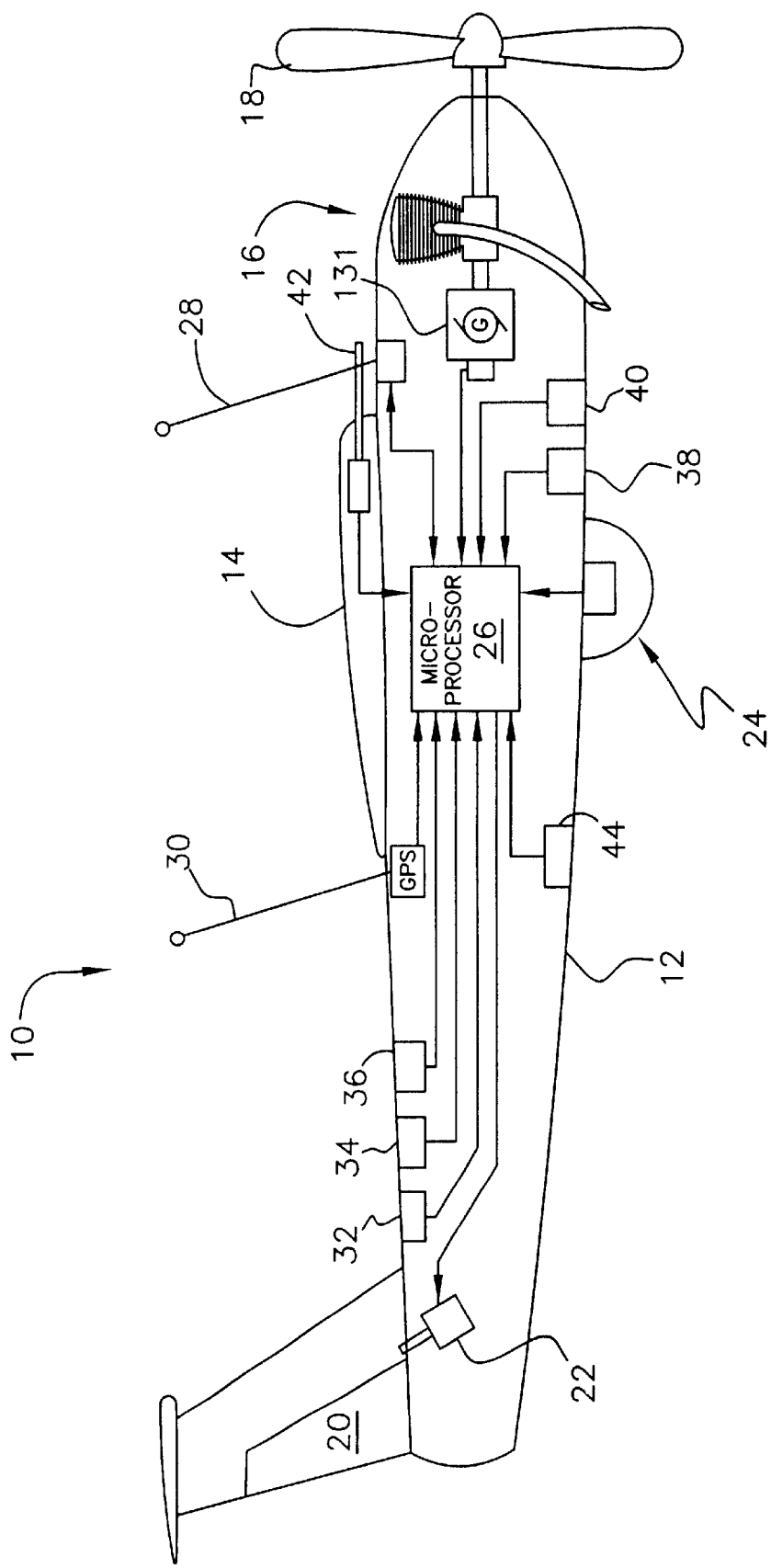
FIG. 1 is a diagrammatic, side elevational view of an aircraft according to one embodiment of the invention.

FIG. 1 of the drawings shows a miniature, unmanned aircraft 10, the principal purpose of which is to acquire or transmit data or both. Acquisition of data signifies that aerial images of ground characteristics and other environmental data may be acquired by sensors such as, for example, digital cameras from the air. Aircraft 10 has an airframe including a fuselage 12, a wing 14, a reciprocating piston internal combustion engine 16 and associated fuel supply system (not separately shown) carried aboard the airframe, and a propeller 18 drivably connected to engine 16. The engine will be understood to include a fuel supply system (not separately shown) carried aboard the airframe. The airframe supports control surfaces such as elevator, rudder, flaps, and ailerons. The latter are shown representatively by rudder 20. Each control surface has a servomechanism, shown representatively as servomechanism 22.

Aircraft 10 is capable of acquiring data or transmitting data or both acquiring and transmitting data. To this end, a mission data handling apparatus 24 disposed selectively to acquire data or transmit data or to both acquire and transmit data is provided. Apparatus 24 may be, for example, a multispectral instrument, an infrared or near infrared sensor, or any other sensor which may be carried aboard miniature, remotely controlled data gathering or transmitting aircraft. Sensors and modules containing the same are more particularly set forth in the copending application entitled MINIATURE, UNMANNED AIRCRAFT WITH INTERCHANGEABLE DATA MODULE, Ser. No. 10/255,186, to which the reader is referred.

Aircraft 10 has a remotely controlled guidance system having a microprocessor 26 disposed to manage flight, a radio frequency transceiver 28 carried aboard the aircraft and disposed to receive remotely generated flight direction commands and to communicate flight direction commands to microprocessor 26, a Global Positioning System (GPS) receiver 30, and a plurality of sensors disposed to sense and acquire data relating to stabilization (as that relates to aircraft attitude) and altitude of aircraft 10. These sensors include flight stabilization sensors including a roll sensor 32, a pitch sensor 34, and a yaw sensor 36, and redundant altitude sensors including a laser or acoustic altimeter 38 and a barometric pressure altimeter 40. A pitot tube 42 serves as a velocity sensor. A flux gate compass 44 determines direction of aircraft 10. The functions of pitot tube 42 and flux gate compass 44 may be redundantly supplemented by calculations using GPS signals considered with respect to time.

Microprocessor 26 will be understood to be a complete system including all necessary programming and memory devices (neither separately shown). Microprocessor 26 is communicably connected to all sensors, radio frequency devices, and instruments described above, so that inputs therefrom may be utilized to generate flight control commands, to transmit back to ground, or both.

In operation, aircraft 10 is controlled from a suitable ground station (not shown) or other source of radio frequency command signals. These signals include directional commands which constitute the only source of directional instruction. No programming contained within microprocessor 26 includes predetermined directional instruction. However, programming provided within microprocessor is capable of processing inputs from the attitude and altitude sensors, and of generating command signals which are then transmitted to servomechanisms represented by servomechanism 22. In the preferred embodiment, microprocessor 26 can, by considering inputs from the various sensors and also GPS receiver 30, determine its location, attitude, altitude, and velocity. These characteristics, and optionally, received and sensed digitized data, are transmitted to the ground station via transceiver 28. For this reason, transceiver 28 could be replaced by a receiver with only reception capability. This arrangement respects limitations regarding internally contained guidance or directional control since although the ground station operator knows where aircraft 10 is, where aircraft 10 is headed, and its velocity, only attitude and altitude data and internally derived command signals are generated within aircraft 10.

A sensor, where only a digital camera is not sufficient, will be understood to include all necessary elements for operability. For example, thermal image acquisition apparatus will be understood to include a source of cooling, for reducing recorded background heat below the threshold necessary to record heat emissions from the subject of the survey. The source of cooling may be a supply of expansible refrigerant, such as a dewar containing a cryogenic material such as liquid nitrogen, or alternatively, as may be required for larger scale projects, an engine powered or electrically powered cooler such as a vapor compression refrigeration machine, a Peltier effect cooler, or any other suitable cooling device. A sensor may comprise additional data processing capability, provided by additional memory devices, microprocessor, or additional connections to a microprocessor and memory devices also utilized for other purposes such as flight guidance and image storage. For laser radar, apparatus will encompass a laser generator, rotatable reflector, and other components required for operability.

For civilian applications, aircraft 10 is subject to certain governmental restrictions. One important criterion for remaining exempt from some restrictions is that the total or gross weight must be limited to fifty-five pounds. This limitation is a significant criterion in avoiding classification of aircraft 10 in a category subjecting aircraft 10 to licensing requirements, export restrictions, and possibly other restrictions. The limitation can be met with appropriate construction of the airframe and selection of components, as more particularly set forth in the copending application entitled MINIATURE, UNMANNED AIRCRAFT WITH INTERCHANGEABLE DATA MODULE, Ser. No. 10/255,186, to which the reader is referred.

Figure 2:
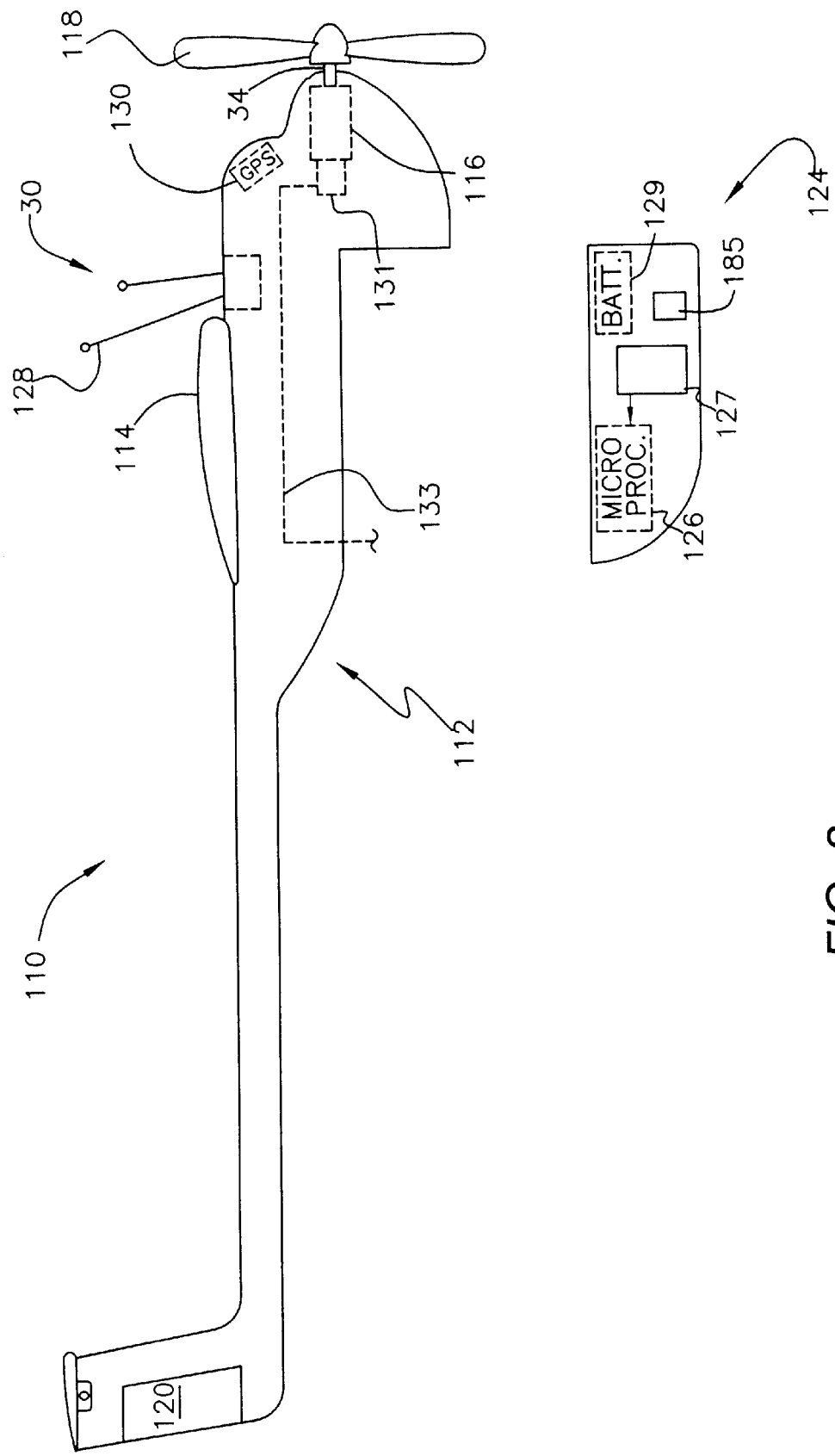
FIG. 2 is a diagrammatic, side elevational view of an aircraft according to a preferred embodiment of the invention.

FIG. 2 shows an aircraft 110 which has most of the functional characteristics of aircraft 10 of FIG. 1, such as a fuselage 112, a wing 114, engine 116, a propeller 118, a rudder 120, and a GPS receiver 130. The significant difference is that aircraft 110 of FIG. 2 has a readily removable and attachable data handling module 124. Module 124 contains a microprocessor 126, a data handling apparatus 127 which may be, for example, a digital camera, and a battery pack 129. Battery pack 129 is connected to the output of engine driven generator 131 when module 124 is installed on fuselage 112 by connection to a power conductor 133. Other power consuming devices comparable to those shown in detail in FIG. 1 must also be connected to power. Connections of power and of communications or data links which enable microprocessor 126 to communicate with controlled components contained within fuselage 112 (or other parts of the airframe such as wing 114) are the subject of the present invention.

2. Electrical and Data Connections

Figure 3:
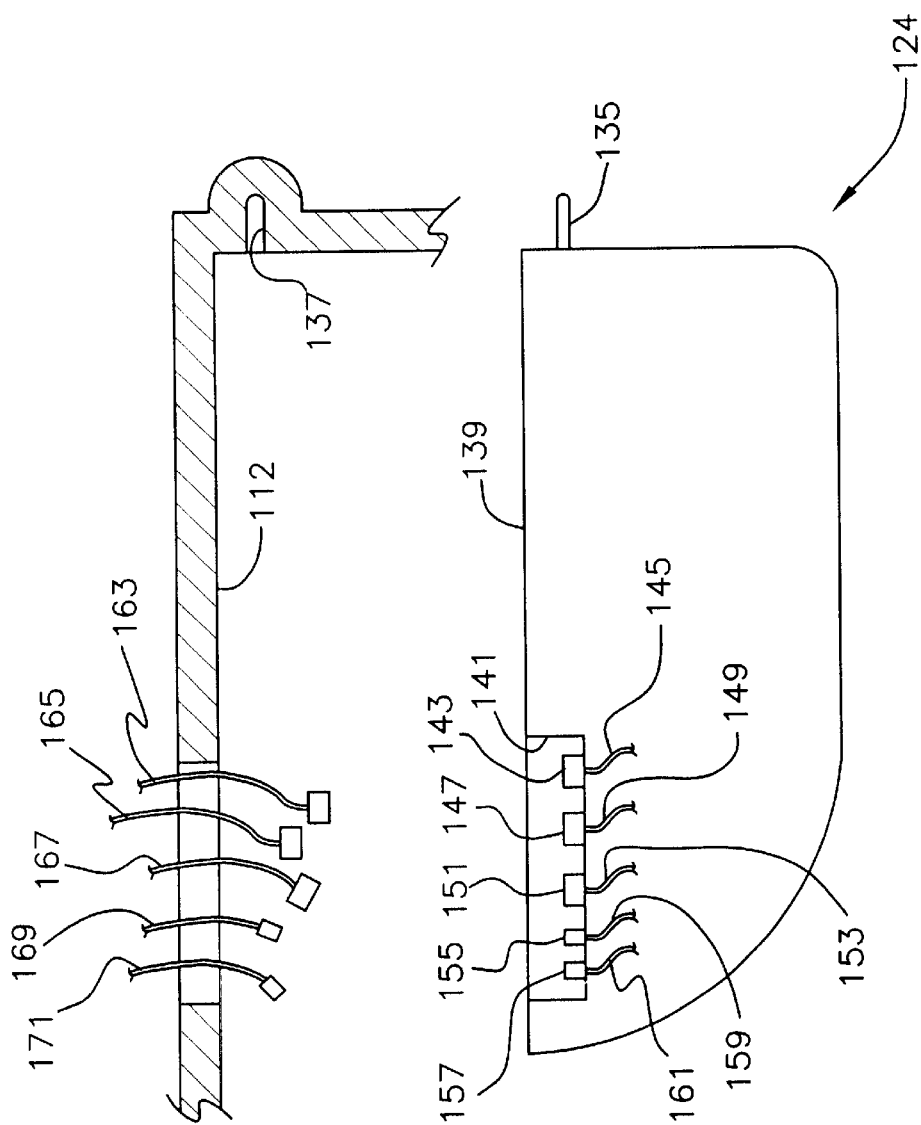
FIG. 3 is a diagrammatic, side elevational detail view showing connection of the lowermost component seen in FIG. 2, drawn to enlarged scale.

FIG. 3 shows details of electrical connection of module 124 to fuselage 112 of aircraft 110. Stationary terminals fixed to the upper surface 139 of the housing of module 124, but seated within a recess 141 formed in the housing for protection are a ground power terminal 143 connected to a ground conductor 145, a first power terminal 147 connected to a first power conductor 149, a second power terminal 151 connected to a second power conductor 153, and two stationary data terminals 155, 157 communicably connected to respective data cables 159, 161 of the communications system. Free power conductors 163, 165, 167 and free data cables 169, 171 are disposed in the airframe where they connect to devices which consume electrical power or which provide data signals to microprocessor 126 (see FIG. 2) or operate by data signals generated by microprocessor 126. Of course, terminals of power conductors 163, 165, 167 and data cables 169, 171 are matingly compatible with respective terminals 143, 147, 151, 155, 157 fixed to module 124. Thus all stationary terminals are disposed in module 124 and all free cables and conductors are disposed in the airframe. This characteristic is preferred but is not critical to the invention, and fixed and free devices may be redistributed between the airframe and module 124 so that some free cables are provided in module 124, if desired. Of course, while cables 163, 165, 167, 169, 171 are represented schematically as single conductors, in practice they may be multiconductor cables configured to convey all necessary signals and power or both between the airframe and module 124.

It will be appreciated that aircraft 110 has an electrical power supply system disposed to distribute electrical power to the various electric power consuming devices, such as microprocessor 126, radio frequency transceiver 128, GPS receiver 130, and a plurality of sensors. The power supply system includes battery 129, generator 131, conductors such as conductor 133 communicating between the airframe and module 124. Also, a communications system is provided to enable microprocessor 126 to receive data from, for example, data handling apparatus 127, and control commands from radio transceiver 128 and to transmit control commands to the various servomechanisms and other devices under automated control. It will be seen in FIG. 3 that microprocessor 126 and data handling apparatus 127 may be located in module 124, while all other power consuming devices are located within the airframe. Other configurations are possible. The communications system includes data cables communicably connected to microprocessor 126, radio frequency transceiver 128, and data handling apparatus 127 at least in part through the connection arrangement illustrated in FIG. 3.

Figure 4:
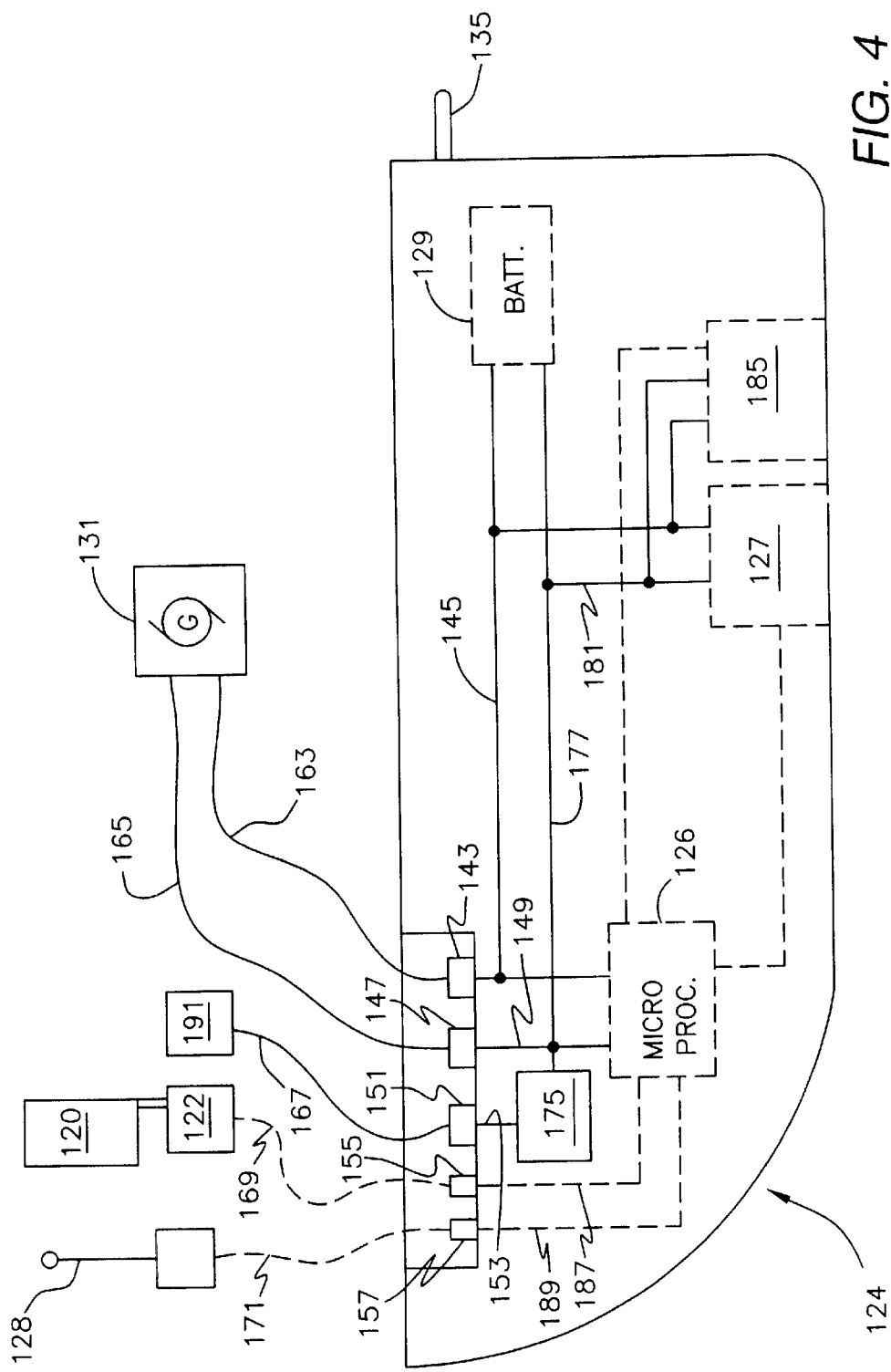
FIG. 4 is a diagrammatic, side elevational detail view showing power and communication connections between the component shown in FIG. 3 and functional components of the aircraft of FIG. 2, drawn to enlarged scale.

Turning now to FIG. 4, the nature of a preferred distribution of components between the airframe and module 124 will now be described. The source of electrical power collectively provided by battery pack 129 and generator 131 is arranged to provide at least two different voltages. This is accomplished by utilizing generator output directly and by incorporating a voltage reducing device 175 into the power circuitry. Thus a first voltage and a second voltage are made available to serve various power consuming devices which may operate at different voltages. Details of this arrangement are more particularly set forth in a copending application entitled ELECTRICAL POWER SUPPLY SYSTEM FOR UNMANNED AIRCRAFT, Ser. No. 10,255,188, to which the reader is referred.

First conductors 177 are connected to the first voltage, while second conductors 153 are connected to the second voltage. These are in addition to ground conductors 145. Third conductors 181 are connected to power consuming devices such as sensors 185 and that of data handling apparatus 127.

Free power conductors 163, 165, 167 complement ground conductor 145 and first and second power conductors 149, 153 to complete power circuits extending between battery pack power consuming devices when free power conductors 163, 165, 167 are connected to respective terminals 143, 147, 151. Of course, not all of the power conductors need to be connected. In some applications, a power conductor may possibly not be used. Only those power conductors which connect to active power consuming devices need be connected to establish operative power circuits.

Similarly, free data cables 169, 171 complement data cables 187, 189 attached to stationary data terminals 155, 157 to complete a communications link extending between microprocessor 126 and data handling apparatus 127 and at least one of the controlled devices contained within the airframe (e.g., transceiver 128, servomechanism 122 operating rudder 120) when free cables 169 and 171 are connected to their respective stationary data terminals 155, 157.

Certain variations and modifications may be introduced without departing from the inventive concept. For example, it would be possible to reverse respective locations of the fixed terminals and the free cables and conductors, if desired.

In other possible embodiments, fixed connectors and free cables could be intermixed between fuselage 112 and module 124. In still other embodiments, all power and signal cables could be combined into a single cable assembly, with connection between the airframe and module 124 being established through a single connector structure (not shown).

It is to be understood that the present invention is not limited to the embodiments described above, but encompasses any and all embodiments within the scope of the following claims.

I claim:

1. A miniature, unmanned aircraft for handling data, comprising:

an airframe including a fuselage, a wing fixed to said fuselage, a reciprocating piston internal combustion engine supported on said aircraft, a propeller drivably connected to said engine, control surfaces operably attached to said aircraft and electrical power consuming devices carried aboard said aircraft including a servomechanism operably connected to each said control surface, a microprocessor carried aboard said aircraft, for managing flight control, a radio frequency receiver connected to said microprocessor, and a data handling apparatus disposed to receive data;

a data handling module including a housing which is manually removably attached to said aircraft and which is disposed to substantially enclose said data handling apparatus, and manual fasteners for removably attaching said housing to one of said fuselage and said wing;

an electrical power supply system disposed to distribute electrical power to said electric power consuming devices, comprising a source of electrical power of at least two different voltages including a first voltage and a second voltage, and circuitry including ground conductors, first conductors connected to said first voltage, second conductors connected to said second voltage, and third conductors connected to said electrical power consuming devices;

a communications system comprising data cables communicably connected to said microprocessor, said radio frequency receiver, and said data handling apparatus, wherein at least one of said microprocessor, said radio frequency receiver, and said data handling apparatus is located in said airframe and at least one of said microprocessor, said radio frequency receiver, and said data handling apparatus is located in said data handling module; and a connection arrangement including stationary terminals disposed in one of said airframe and said data handling module, and at least one free data cable and free power conductors disposed in the other one of said airframe and said data handling module, wherein said stationary terminals include a ground power terminal connected to a said ground conductor, a first power terminal connected to at least one of said first conductors, a second power terminal connected to at least one of said second conductors, and a stationary data terminal communicably connected to at least one of said data cables of said communications system, and said free power conductors are matingly compatible with said first power terminals and said second power terminals, and said free data cables are matingly compatible with said stationary data terminal, and said free power conductors complement said ground conductor connected to said ground terminal, said first conductor connected to said first power terminal, and said second conductor connected to said second power terminal to complete power circuits extending between said source of electrical power and said power consuming devices when said free power conductors are connected to said ground terminal, and at least one of said first power terminal and said second power terminal, and said free data cables complement said data cable attached to said stationary data terminal to complete a communications link extending between said microprocessor and at least one of said radio frequency receiver and said data handling apparatus when said free cable is connected to said stationary data terminal.

2. The miniature, unmanned aircraft according to claim 1, further comprising a GPS receiver located in said airframe.

3. The miniature, unmanned aircraft according to claim 1, wherein said microprocessor is located in said data handling module, said source of electrical power is located in said airframe, and said radio frequency receiver is located in said airframe.

4. The miniature, unmanned aircraft according to claim 1, wherein said stationary terminals are located on said housing of said data handling module.

5. The miniature, unmanned aircraft according to claim 1, wherein said source of electrical power comprises an engine driven generator located in said airframe and a battery pack located in said data handling module, and said generator and said battery pack are mutually electrically connected through said connection arrangement.

* * * * *